United States Patent
Tsai

(10) Patent No.: US 6,994,260 B2
(45) Date of Patent: Feb. 7, 2006

(54) CARD READING DEVICE

(75) Inventor: Wen-Cheng Tsai, Yung-Ho (TW)

(73) Assignee: Singim International Corporation, Taipei Hsien (TW)

( * ) Notice: Subject to any disclaimer, the term of this patent is extended or adjusted under 35 U.S.C. 154(b) by 0 days.

(21) Appl. No.: 10/717,258

(22) Filed: Nov. 18, 2003

(65) Prior Publication Data

US 2005/0103845 A1    May 19, 2005

(51) Int. Cl.
*G06K 13/00* (2006.01)

(52) U.S. Cl. .................................... 235/475
(58) Field of Classification Search ............... 235/475, 235/451, 492, 441, 482, 483, 486; 439/630–631
See application file for complete search history.

(56) References Cited

U.S. PATENT DOCUMENTS

| 6,570,767 B1 * | 5/2003 | Vapaakoski et al. ........ 361/737 |
| 6,612,492 B1 * | 9/2003 | Yen ............................. 235/451 |
| 6,736,323 B2 * | 5/2004 | Hochgesang et al. ........ 235/475 |
| 6,761,320 B1 * | 7/2004 | Chen ........................... 235/492 |
| 6,786,415 B2 * | 9/2004 | Yiu .............................. 235/486 |
| 2001/0053622 A1 * | 12/2001 | Oguchi ........................ 439/188 |
| 2002/0052147 A1 * | 5/2002 | Sato ............................. 439/630 |
| 2002/0065001 A1 * | 5/2002 | Sun .............................. 439/630 |
| 2002/0102883 A1 * | 8/2002 | Mithuhashi et al. ......... 439/630 |

\* cited by examiner

*Primary Examiner*—Thien M. Le
*Assistant Examiner*—Edwyn Labaze

(57) ABSTRACT

A card reading device includes a card-reception base provided with a reception space in size corresponding to a card to be read with a plurality of contact zones, a card-reception zone on a first side thereof, and a fastener-reception zone on a second side thereof; a card reading portion located at the card-reception zone being provided with a plurality of resilient leaves and a flange, in which the resilient leaves are located at the bottom face of the card-reception zone and corresponding to the contact zones, while the flange is disposed in parallel with the transverse direction of the card-reception base; and a push-to-joint portion having its top face extended to form a protruding portion, being located at the fastener-reception zone in parallel with the transverse direction of the card-reception base.

6 Claims, 5 Drawing Sheets

CARD READING DEVICE

BACKGROUND OF THE INVENTION

1. Field of the Invention

The present invention relates to card readers, and more particularly to a card reading device, from or into which a self-explanatory card could be taken or put conveniently.

2. The Prior Arts

As shown in FIG. 1 of the attached drawings, a conventional card reading device, generally designed with reference numeral 1, defines a reception space 11 for accommodating a card 10 to be read. However, when a card 10 is inserted in the card reading device 1, it is entirely received in the reception space 11 and users are unable to read information marked on an outside surface of the casing of the card 10, unless the contents of the card 10 are read and displayed by the card reading device.

Progress of technology brings diversity of memory cards. In response to such diversity, a card reading device is functionally enhanced whereby a single card reading device is capable of different types of cards. However, due to the same reason discussed above, there is no way for the user to identify the type and contents of the card that is received in the card reading device.

SUMMARY OF THE INVENTION

In view of the above-mentioned drawbacks, the present invention is aimed to provide a card reading device comprising a card reception base defining a reception space for accommodating a card to be read, the card reception base having a plurality of contact zones, a card-reception zone on a first side thereof, and a fastener reception zone on a second side thereof; a card reading portion located at the card reception zone being provided with a plurality of resilient leaves and a flange, in which the resilient leaves are located at the bottom face of the card reception zone and corresponding to the contact zones, while the flange is disposed in parallel with the transverse direction of the card-reception base; and a push-to-joint portion having its top face extended to form a protruding portion, being located at the fastener reception zone in parallel with the transverse direction of the card-reception base.

The present invention has the following advantages:

(1) A brief of a card is always viewable from outside.

(2) Change of cards is easy due to the adoption of resilient members in the card reading device of the present invention.

(3) The clench effect between a card and the card reading device is improved under the assistance of the flange and the protruding portion.

For more detailed information regarding advantages or features of the present invention, at least an example of preferred embodiment will be described below with reference to the annexed drawings.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
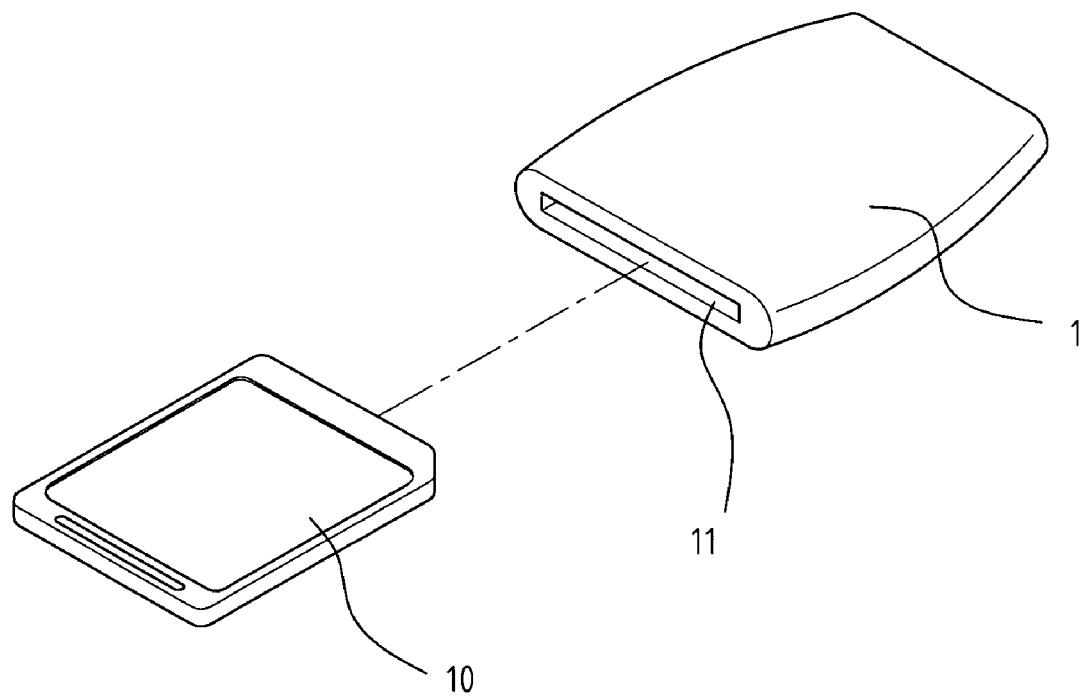
FIG. 1 is a perspective view showing a conventional card reading device, together with a card to be read.
Figure 2:
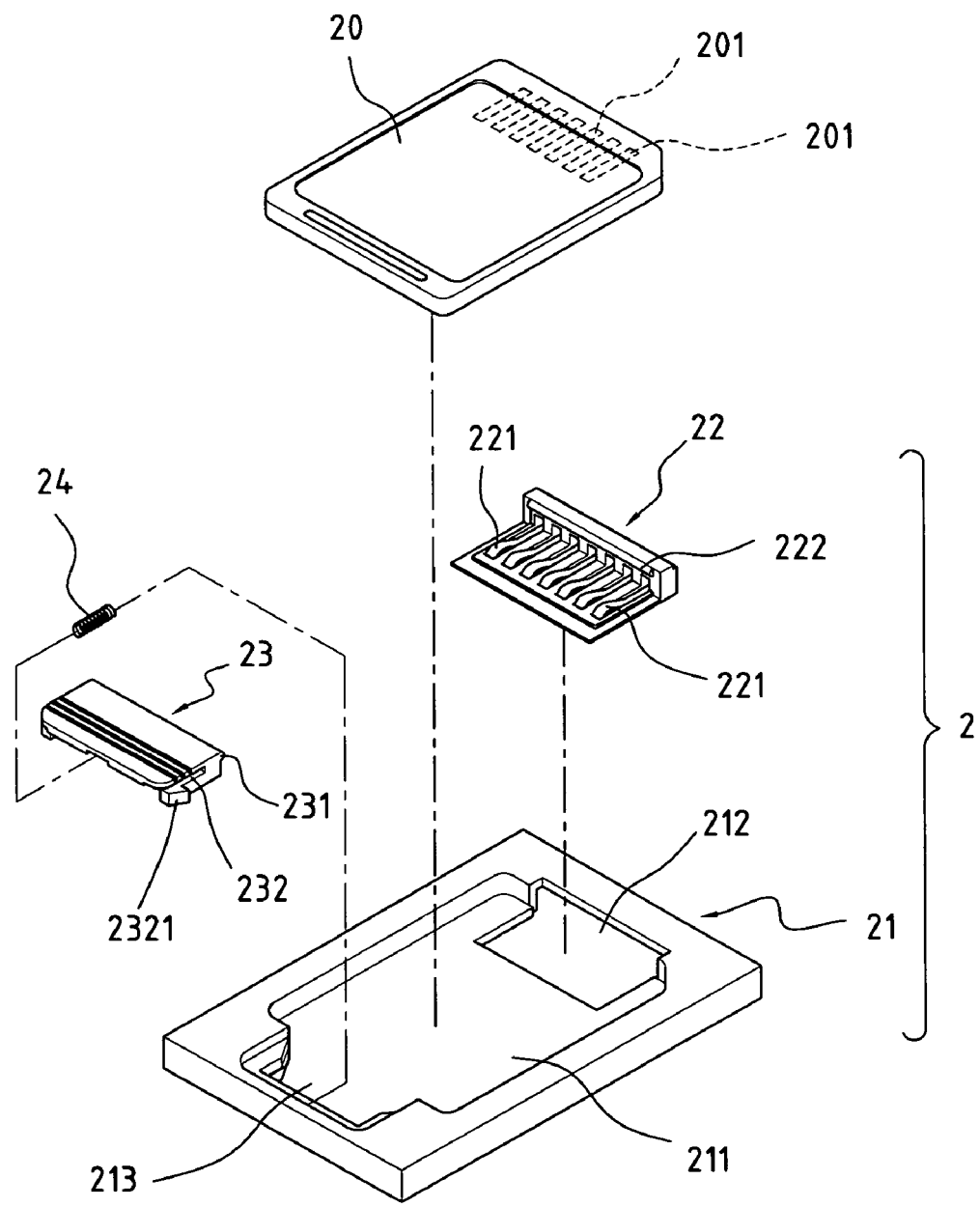
FIG. 2 is an exploded view of a card reading device in accordance with the present invention.

With reference to the drawings and particularly to FIG. 2, a card reading device constructed in accordance with the present invention, generally designated wit reference numeral 2, comprises a card reception base 21, a card reading portion 22, and a push-to-joint portion 23. The card-reception base 21 has a card-reception space 211 for accommodating a card 20 to be read with one lateral face of the card exposed for observation. Furthermore, the card reception base 21 has two opposite ends in which a card reception zone 212 and a fastener reception zone 213 are formed respectively.

The card reading device 2 is designed to read different types of card, such as Multi-Media Card, Smart Media Card, and Secure Digital Memory Card. The card 20 to be read usually has a plurality of contact zones 201 for electrical engagement with the card reading device 2.

The card reading portion 22 has a plurality of resilient conductive leaves 221 located at a bottom of the card reception zone 212 on the first side of the card reception base 21 and corresponding in position to the contact zones 201 of the card 20. When the card 20 is placed in the card reception base 21, the resilient leaves 221 engage the contact zones 201. The card reading portion 22 is formed with a flange 222 extending in the transverse direction of the card reception base 21 for propping against the card 20 as shown in FIGS. 4 and 5.

Figure 4:
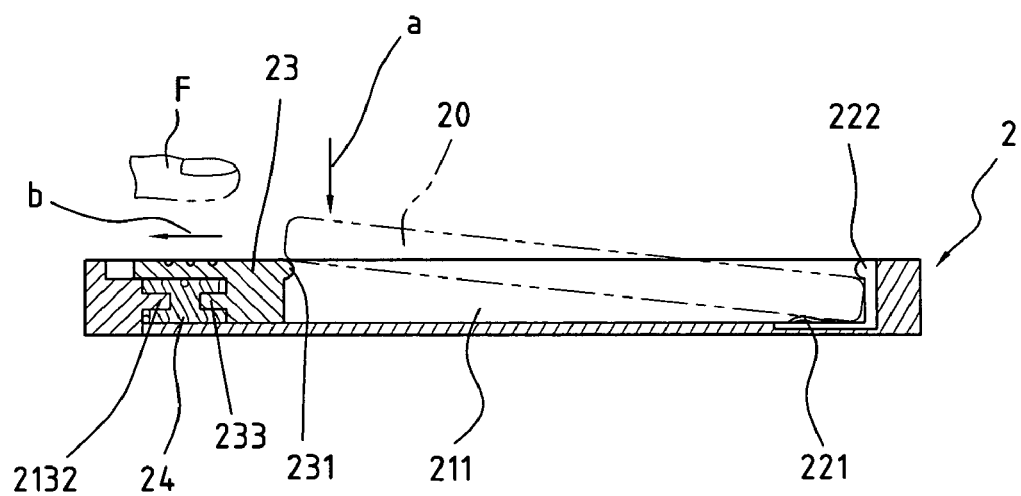
FIG. 4 is a cross-sectional view showing an initial stage of positioning a card into the card reading device of the present invention.
Figure 5:
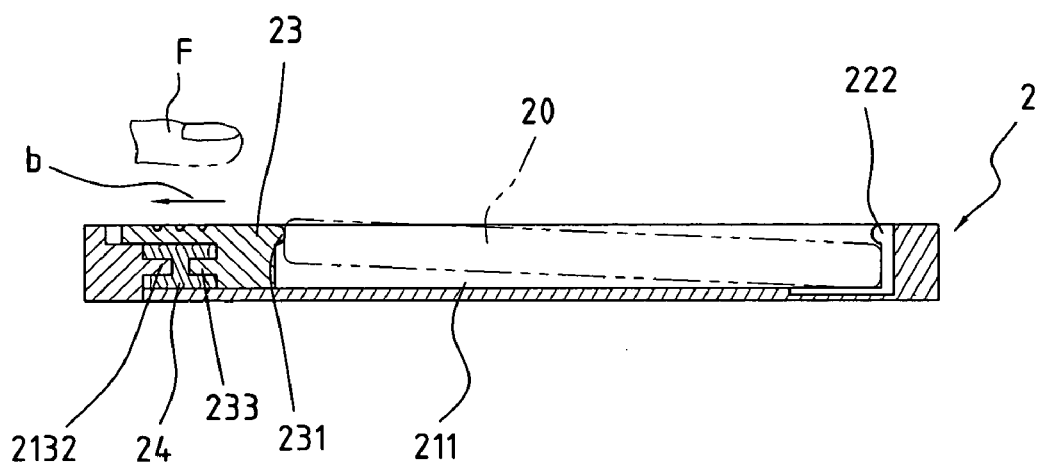
FIG. 5 is similar to FIG. 4 but showing a subsequent stage of positioning a card into the card reading device of the present invention.

The push-to-joint portion 23 is located at the fastener reception zone 213 on a second side of the card reception base 21, and has its top face extended to form a protruding portion 231 extending in the transverse direction of the card reception base 21 for propping against the card 20 as shown in FIGS. 4 and 5.

Figure 3:
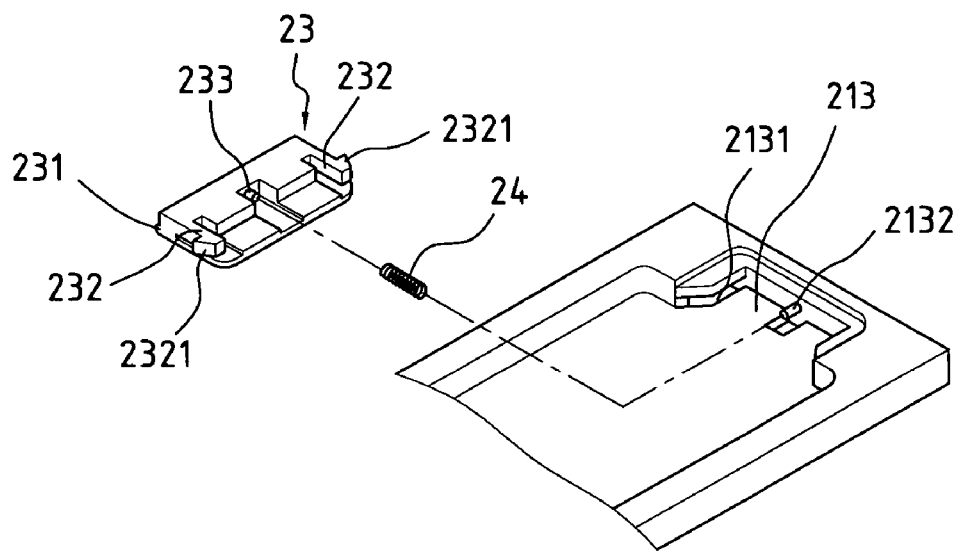
FIG. 3 is an exploded view of a portion of the card reading device shown in FIG. 2 viewed from different perspective.

A preferred fastener-reception zone 213 of the card reception base 21 shown in FIG. 3 further comprises: a groove 2131 defined in the bottom face of the card-reception base 21; a rail 232 defined on each side of the push-to-joint portion 23; and a fastening hook 2321 defined at the tail end of each rail 232 so that the push-to-joint portion 23 is movable in the fastener-reception zone 213 along the groove 2131 by means of the cooperation of rails 232 and the grooves, and stopped by fastening it to the fastening hooks 2321.

Also referring to FIGS. 4 and 5, to place a card 20 into the card reading device 2, a user depresses the card 20 downwardly in the direction indicated by arrow a to have the card 20 inserted into the reception space 211 of the card reception base 21. Alternatively, the user may put a finger F on the push-to-joint portion 23 to pull the push-to-joint portion 23 back in the direction marked b to retreat the protruding portion 231 of the push-to-joint portion 23, such that the card 20 can be placed downwardly in the reception space 211 of the card-reception base 21.

To remove the card 20 from the card reading device 2, the push-to-joint portion 23 is moved by the finger F in the direction indicted by arrow b so that the protruding portion 231 of the push-to-joint portion 23 can be reheated to depart from the card 20. At this time, the card 20 is rebounded upwardly by the resilient leaves 221 and separated from the card reception base 21.

A resilient member 24, such as a spring, a first protruding rod 2132 and a second protruding rod 233 are further provided to the card reading device 2, the fastener reception zone 213 of the card reception base 21, and the push-to-joint portion 23, respectively, in which both the first and the second protruding rod 2132, 233 are sheathed by the resilient member 24.

A user needs only to depress a card 20 downwardly in the direction a to place the card 20 into the reception space 211 of the card reception base 21. Or the user may place a finger F on the push-to-joint portion 23 to move the push-to-joint portion 23 in the direction b. The push-to-joint portion 23 will be restored back to its original position by an elastic force of the resilient member 24 after the card 20 has been inserted in the reception space 211 of the card-reception base 21. On the contrary, when drawing out the card 20 is desired, the user is supposed to put his finger F on the push-to-joint portion 23 and pull it in the direction b to take the card 20 out of the card-reception base 21 easily, and meanwhile, the push-to-joint portion 23 will get restored as before by means of the elastic force provided by the resilient member 24.

According to the present invention, a user can view the brief content of a card already inserted in a card reading device before reading action is performed, also change of card becomes easier due to the resilient member, and labor-saving is possible because of a simple installation job.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A card reading device comprising:
   a card-reception base having a reception space corresponding to a card to be read with a plurality of contact zones, a card-reception zone on a first side of said base, and a fastener-reception zone on a second side of said base;
   a card reading portion located at the card-reception zone and comprising a plurality of resilient leaves and a flange, in which the resilient leaves are located at the bottom face of the card-reception zone and corresponding to the contact zones, while the flange is disposed in parallel with the transverse direction of the card-reception base; and
   a push-to-joint portion having its top face extended to form a protruding portion, being located at the fastener-reception zone in parallel with the transverse direction of the card-reception base;
   wherein the card reading device receives the card to be read from a top opening above the reception space with the flange and the protruding portion propping against the card to hold the card in place, and a top face of the card is visible through the top opening.

2. The card reading device according to claim 1, wherein a groove is defined in the bottom face of the fastener-reception zone of the card-reception base; a rail defined on each side of the push-to-joint portion; and a fastening hook defined at the tail end of each rail so that the push-to-joint portion is movable in the fastener-reception zone along the groove by the cooperation of the rails and the grooves, and stopped by fastening it to the fastening hooks.

3. The card reading device according to claim 1, wherein a resilient member, a first protruding rod, and a second protruding rod further provided respectively to the card reading device, the fastener-reception zone of the card-reception base, and the push-to-joint portion, in which both the first and the second protruding rods are sheathed by the resilient member.

4. The card reading device according to claim 1, wherein the card conforms to the specifications of a Multi Media Card.

5. The card reading device according to claim 1, wherein the card conforms to the specifications of a Smart Media Card.

6. The card reading device according to claim 1, wherein the card conforms with the specifications of a Secure Digital Memory Card.

* * * * *